United States Patent [19]

Pierce

[11] Patent Number: 5,636,664

[45] Date of Patent: Jun. 10, 1997

[54] CONDUCTOR PREFORM REMOVER

[75] Inventor: Garry L. Pierce, Houston, Tex.

[73] Assignee: Houston Industries Incorporated, Houston, Tex.

[21] Appl. No.: 514,148

[22] Filed: Aug. 11, 1995

[51] Int. Cl.$^6$ ................................................ B21F 21/00
[52] U.S. Cl. .................................... 140/123; 57/1 UN
[58] Field of Search ................................ 140/123, 124; 72/458, 459; 57/1 UN, 2.3

[56] References Cited

U.S. PATENT DOCUMENTS 2,966,774  1/1961  Bowen ................................ 140/123
3,744,230  7/1973  Santistevan .......................... 57/1 UN
5,125,437  6/1992  Pierce .

*Primary Examiner*—Lowell A. Larson
*Attorney, Agent, or Firm*—Pravel, Hewitt, Kimball & Krieger

[57] ABSTRACT

A preform remover is more easily attachable to the conductor for removing a protective wire preform wrapped on an electrical conductor. The preform remover is also more easily operable by a single line worker, even in locations relatively inaccessible to the line crew. The preform remover eases the initial separation of the preform end from the conductor, and is also readily changeable to accommodate different wire sizes.

24 Claims, 4 Drawing Sheets

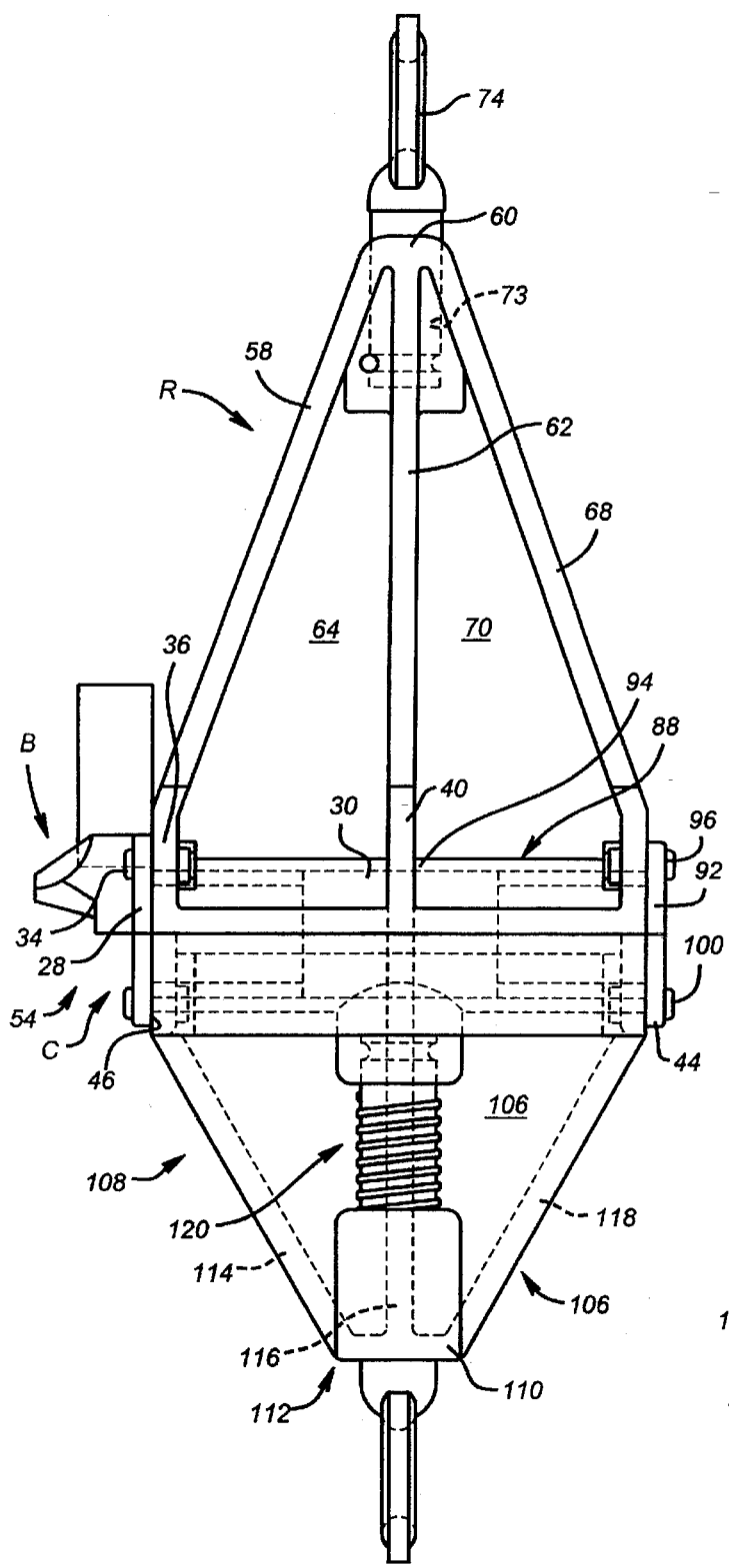
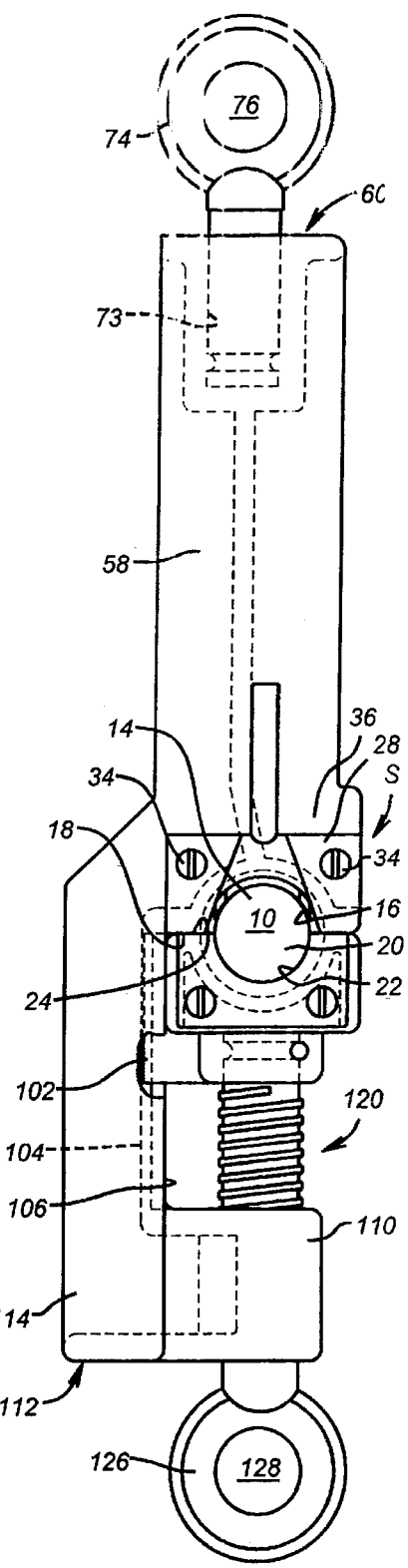
FIG. 3
FIG. 4

CONDUCTOR PREFORM REMOVER

BACKGROUND OF INVENTION

1. Field of Invention

The present invention relates to apparatus for removing a tie wire, known as a preform, from an electrical power distribution conductor.

2. Description of the Prior Art

Commonly owned U.S. Pat. No. 5,125,437, of which applicant is inventor, relates to removal of a protective wrapping from a live electrical power conductor. Structure according to this patent has solved certain problems encountered by line crews and has been accepted and widely used. However, experience has shown that several problems still remained when this structure was used.

For example, the structure of this patent required two manipulator poles or hot sticks, with engaging hooks of the conventional type at their ends, be used when removing preforms, particularly when attaching the base and cover portions of the remover onto the conductor. One pole was required to move and manipulate the cover member onto the conductor. Another pole was required to position the base member on the conductor. A number of utilities for safety reasons did not allow a line crew member working on a power line to handle more than one hot stick at any time. Thus, two crew members would often be required for use of this type of preform remover.

There were times when fitting this type of preform remover on a cable could be a problem. Preform removers of this prior type were sized for particular cable diameters. Thus, for a typical utility with several connector sizes, a number of remover tools would be required for a service crew truck. Storage space on trucks has often been quite limited, and the requirement for a different tool for each cable caused space problems on the service truck.

Also, although a precision fit of the preform remover on the conductor was not mandatory, problems occurred when the preform remover was either too tightly or too loosely fitted onto the conductor. When the fit was tight, rotation of the preform remover on the cable was difficult. Situations have occurred when the perform remover would bind so tightly on the conductor that rotation did not occur even before removing the preform. In some instances, the preform remover has become so tightly bound on the conductor that its removal presented a problem. When the preform remover was too loosely fitted onto the conductor, there was also the possibility of inadequate grip or leverage to pry or twist the preform loose from the conductor.

SUMMARY OF INVENTION

Briefly, the present invention provides a new and improved conductor preform remover to remove the protective preform or wire wrapping from an electrical power conductor. The present invention also provides a new and improved method of removing the preform wire from an electrical power conductor.

A preform remover according to the present invention includes a base member which has a channel formed in it to receive a portion of the electrical power line for passage through it. The preform remover of the present invention also includes a cover which is adapted to be fitted onto the base member to form a sleeve with it. The sleeve so formed has a bore through which the electrical power line passes.

The base member is mounted with a first jaw member of the preform remover, while the cover is mounted with a second jaw member. The two jaw members are relative moveable with respect to each other under forces transferred to them through gears or other suitable motive mechanisms so that the sleeve may be opened and closed on the electrical power line. The motive mechanisms are operable by a single crew member using a conventional insulating rod or hot stick.

The preform remover of the present invention is also provided with a handle which can be engaged by the insulative rod or hot stick. Thus, once the preform remover is properly mounted on the power line, the handle can be moved by the hot stick to rotate the sleeve with respect to the electrical power line. A preform contact is formed on the sleeve to engage and unwrap the preform as the sleeve is rotated along the electrical power line.

BRIEF DESCRIPTION OF THE DRAWINGS

FIG. 3 is a side elevation view of the preform remover of FIG. 1.

FIG. 4 is a front elevation view, with certain portions partially removed, of the preform remover of FIG. 1.

DESCRIPTION OF PREFERRED EMBODIMENT

Figure 1:
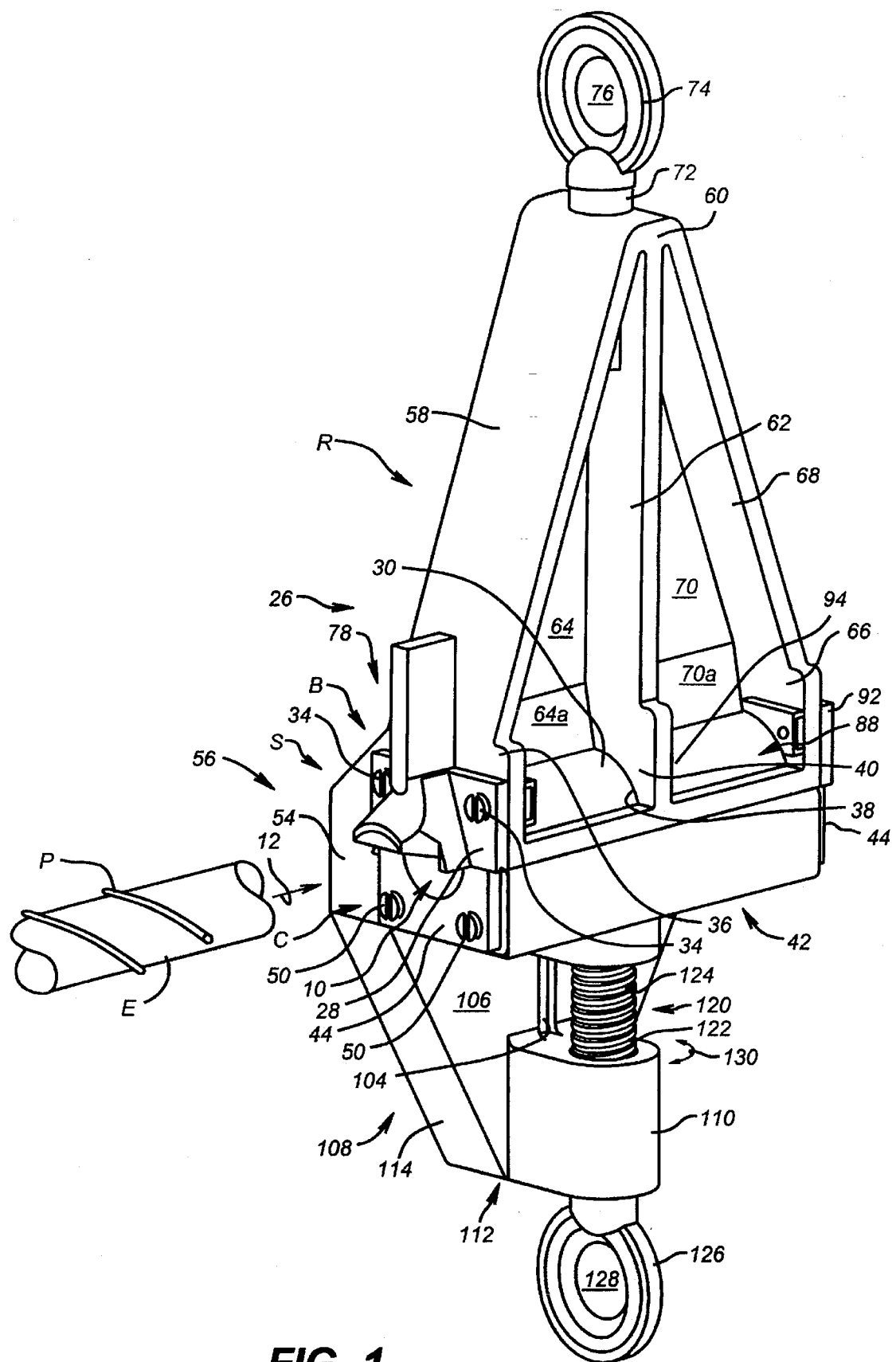
FIG. 1 is an isometric view of a preform remover according to the present invention.

In the drawings, the letter R designates generally a preform remover according to the present invention for removing a protective preform P or wire wrapping from an electrical power conductor or cable E. The preform remover R is adapted to be rotated and advanced along the length of the power line E to wedge the preform P off and unwrap it from the power line E. The preform remover R of the present invention includes a base member B and a cover member C which together form a sleeve S. The sleeve S has a bore or passage 10 through which the electrical power line E passes.

The base member B and cover member C rotate the sleeve S about the power line E along the base 10 and thus alternate between positions above and below the power line. Since the base member B is usually uppermost when the remover R is being installed, it is shown in that position in the drawings. The bore 10 is aligned with a longitudinal axis, as indicated by an arrow 12, of the electrical power line E. Portions of the length of power line E have not been shown in the drawings, so that the structure of the preform remover R may be more clearly seen.

Base member B has a channel 14 (FIG. 4) formed in it to receive a half-cylindrical segment of the electrical power line E. The channel 14 is formed adjacent a half-cylindrical inner surface 16 of the base member B extending away from a generally planar or flat contact surface 18. Similarly, the cover member C has a semi-cylindrical passage or channel 20 formed adjacent a half-cylindrical surface 22 extending below a generally planar contact surface 24. When the contact surface 18 of the base member B and the contact surface 24 of the cover member C are brought into general proximity or contact with each other, the sleeve S is formed with the adjacent channels 14 and 20 together forming the passage 10.

Figure 2:
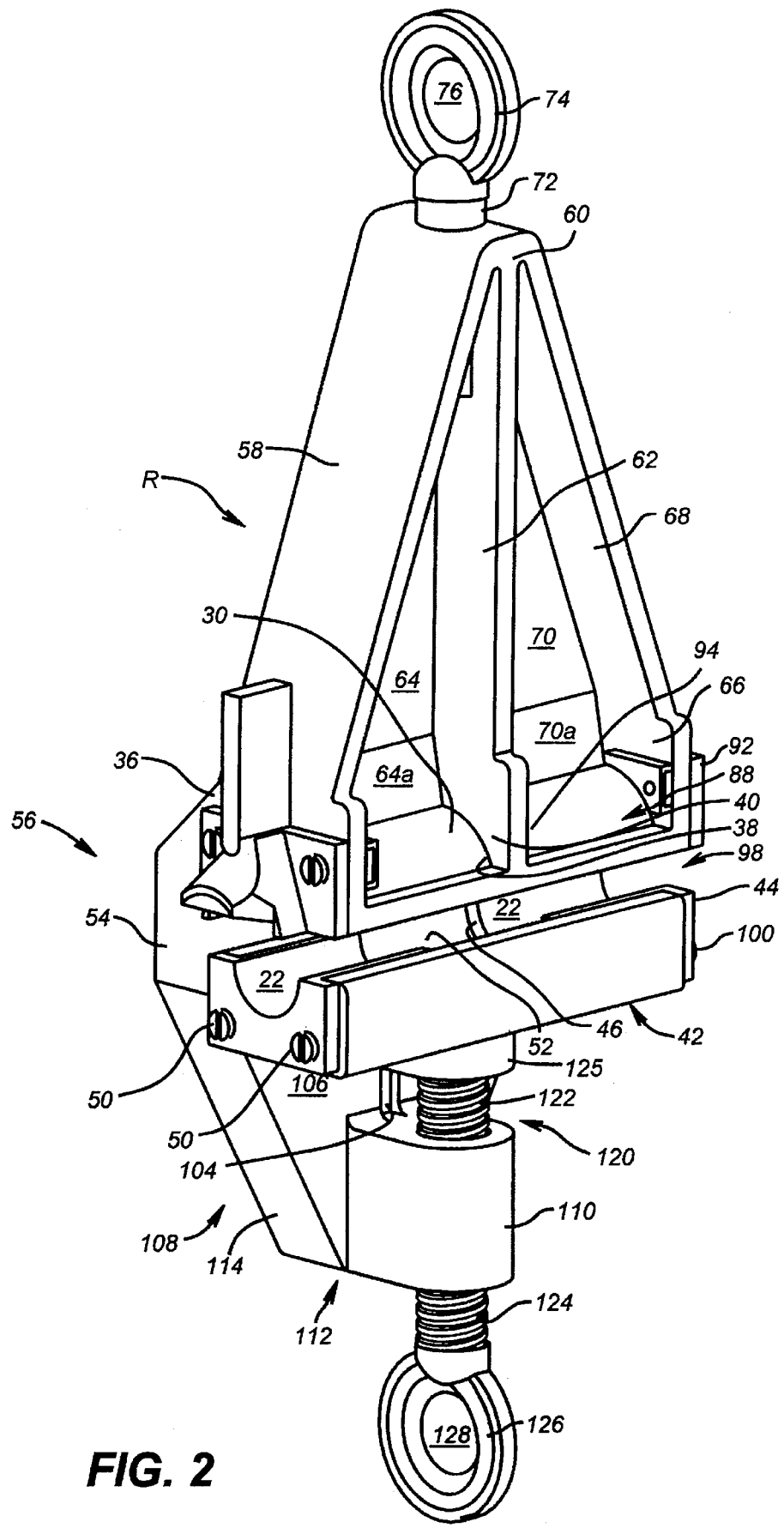
FIG. 2 is another isometric view of the preform remover of FIG. 1 partially open.
Figure 5:
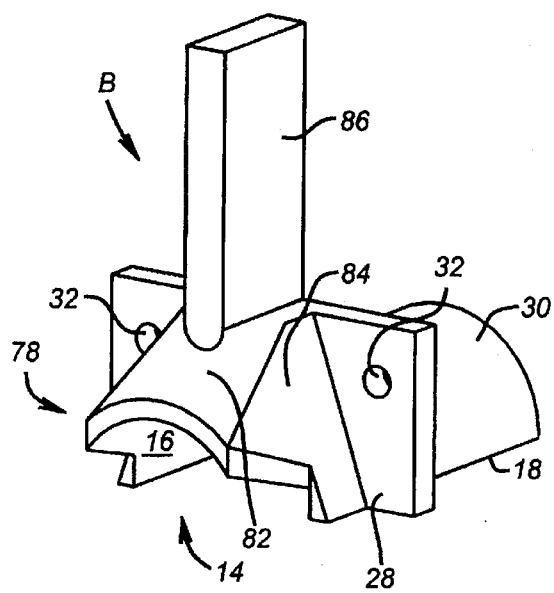
FIGS. 5, 6, 7, and 8 are isometric views of certain component parts for the preform remover of FIG. 1.

The base member B is mounted with a first, fixed jaw member 26 (FIGS. 1 & 2) of the preform remover R. The inner surface 16 of the base member B extends from a forward mounting shoulder 28 (FIGS. 1 & 5) at a forward end to a cylindrical rear sleeve portion 30. Openings or ports 32 (FIG. 5) are formed in the mounting shoulder 28 so that connector screws 34 (FIGS. 1-4) or other suitable fasteners may be inserted to attach the mounting shoulder 28 to a connector plate 36 of the jaw member 26. The rear sleeve portion 30 of the base member B is adapted to fit against a cylindrical receiving surface 38 (FIGS. 1 & 2) formed in a central mounting plate 40 of the jaw member 26.

Figure 6:
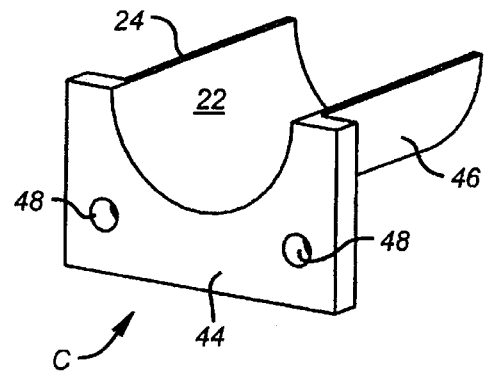

The cover member C is mounted on a second, movable jaw member 42. The inner surface 22 of the cover member C extends from a forward mounting shoulder 44 (FIG. 6) rearwardly toward a cylindrical rear sleeve portion 46. Openings or passages 48 are formed in the mounting shoulder 44 so that screws or other suitable connectors 50 (FIGS. 1-4) may be inserted in order to attach the mounting shoulder 44 and cover member C to a side face 45 (FIG. 3) of the jaw member 42. The rear sleeve portion 46 of the cover member C is adapted to be fitted against a cylindrical inner receiving surface 52 (FIG. 2) of the jaw member 42.

The first jaw member 26 is a fixed or upper jaw member formed at a central location 54 (FIG. 2) on a support body 56. The support body 56 includes an outer rail 58 extending upwardly from the connector plate 36 to a top or juncture segment 60. The support body 56 also includes a central stiffener rib 62 formed extending upwardly from the central mounting plate 40 to the top portion 60. A plate or web 64 is formed extending laterally between the outer rail 58 and the stiffener rib 62 for structural integrity of the support body 56. A lower portion 64a of web 64 is preferably made thicker for increased strength.

The support body 56 further includes a rear connector plate 66 which is connected by a rear outer rail 68 to the top or juncture portion 60. A web or plate 70 is formed in the support body 56 between the rail 68 and the stiffener rib 62 for further structural integrity. A lower portion 70a of web 70 is also preferably made thicker for increased strength.

A support post 72 is rotatably mounted in a socket 73 adjacent the top 60. The support post 72 is formed extending upwardly from the top or juncture 60 to support a handle or eyelet 74 with a central opening 76 extending thereabove. The opening 76 in the handle 74 is adapted to receive and be engaged by a conventional hook mounted at the end of an insulated rod or hot stick of the conventional type. A suitable example of such a hot stick is that illustrated, for example, in commonly owned U.S. Pat. No. 5,125,437. The subject matter of this patent is incorporated herein by reference for all purposes.

The base member B includes a preform contact 78 (FIG. 5) formed extending outward from the mounting shoulder 28. The preform contact 78 has a tapered leading contact surface 80 for contacting and wedging the preform P away from the electrical power line L. The contact surface 80 is formed at a leading end of a tapered surface 82 of a ramp member 84 which extends outwardly from the mounting shoulder 28.

The preform contact 78 also includes an unwrapping arm or finger 86 extending vertically upwardly from the ramp 84 on the mounting shoulder 28. The unwrapping arm 86 is adapted to initially engage an end portion N of the preform P and wedge it away from the power line E. Thereafter, portions of the preform P behind the end portion N are wedged away from the electrical power line L by the contact surface 80 and unwrap such portions of the preform P from the electrical power line L.

For increased stability of the preform remover R on the power line E, it is preferable that the extent of contact of both the base member B and cover member C be longer than normally required for contact and stripping of the preform P. This can be done by increasing the rearward extent of the respective sleeve portions 30 and 46 beyond the central portions of the jaw members 26 and 42.

Alternatively, the fixed jaw 26 may be provided with a second or additional base member 88. The second base member 88 is mounted with the support body 56 rearwardly from the base member B. The second base member 88 has a channel formed therein coaxially aligned with the channel 14 formed in the base member B. Thus, the electrical power line E may pass rearwardly through the sleeve S of the preform remover R as the preform remover R is being advanced along the power line E.

The second base member may be of like shape and configuration to the cover member C, having a rear mounting shoulder 92 (FIGS. 1-3) at a rearward end extending forwardly to a cylindrical forward sleeve portion 94. The forward sleeve portion 94 of the second base member 88 is adapted to fit inwardly beneath and against the cylindrical receiving surface 38 below the central mounting plate 40 of the first jaw member 26. Connector openings or ports are formed in the mounting shoulder 92 so that connector screws 96 (FIG. 3) or other suitable fasteners may be inserted to attach the mounting shoulder 92 to the rear connector plate 66 of the support body 56.

A second cover member 98 (FIG. 2) functioning as an extension of the cover member C is fitted in the movable jaw member 42 rearwardly from the cover member C. The second cover member 98 is of like structure and function to the cover member C (FIG. 6) differing only in that it is reversed in position in the movable jaw member 42 when attached therewith by connector screws 100. Accordingly, like reference numerals are used on cover member 98 for like structure to that of the cover member C. The rear portion 46 (FIG. 2) of cover member 98 is thus also fitted against the cylindrical inner receiving surface 52 at a central portion of the movable jaw 42.

The second or lower, movable jaw 42 is mounted along a rearwardly extending rail or runner 102 (FIG. 4) for sliding movement up and down along a guide slot 104 formed extending outwardly from a support surface 106 on a lower portion 108 of the support body 56. The support surface 106 extends downwardly to an outwardly extending lower sleeve member 110. The sleeve member 110 is internally threaded and is formed on the support surface 106 adjacent a lower junction or connector 112 of the support body 56. Stiffener ribs or rails 114, 116, and 118 (FIG. 3) are formed across the support body lower portion 108 extending downwardly from the central portion 54 to the lower portion 112 adjacent the sleeve 110.

A gear mechanism 120 is provided in the preform remover R to move the jaw member 42 relative to the jaw member 26 to open and close the sleeve S. The gear mechanism 120 includes a threaded rod 122 having a threaded external surface 124 which is received within the threaded internal surface within the sleeve 110. The threaded rod 122 is rotatably movable within the sleeve 110 and extends upwardly for rotatable connection into a socket 125 formed extending below the movable jaw member 42. Rotation of the rod 122 causes the movable jaw 42 to retract or advance with respect to the fixed upper jaw 26.

A rotation handle or eyelet 126 having a central opening 128 is formed at an outer end of the threaded rod 122. The opening 128 is adapted to receive and engage the hot stick hook. The hot stick can then be rotated to cause the threaded rod 122 to be rotated in either direction as indicated by an arrow 130. As the threaded rod rotates, the movable jaw 42 then retracts or advances with respect to the fixed upper jaw 26 according to the direction of rotation of rod 122.

As has been set forth, typical electrical power systems have preforms on various sizes and diameters of electrical power lines. So far as is known, prior preform removers have been suitable for use with only a single diameter or size of power line. The problems this has caused have been identified above.

With the present invention, each of the jaw members 26 and 42 of the preform remover R is adapted to receive different base members and covers for each of several power line diameters. The different sizes of covers and base members are easily removed and replaceable through the connector screws 34, 50, 96 and 100 on the jaw members 26 and 42.

Figure 7:
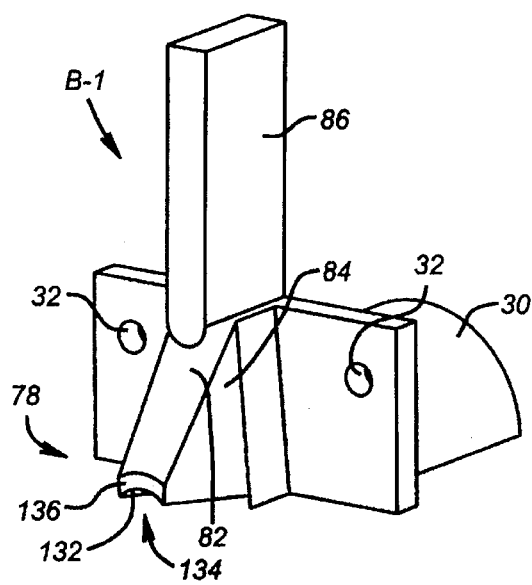
Figure 8:
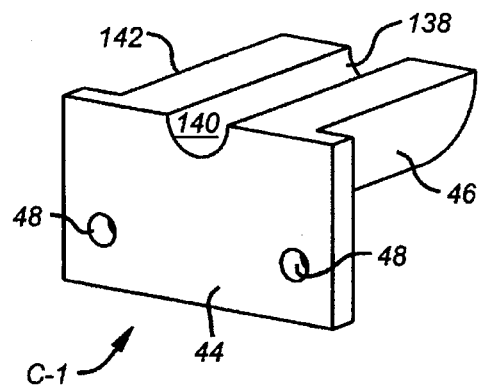

For example, an alternate base member B-1 (FIG. 7) and an alternate cover member C-1 (FIG. 8) can be easily installed in the jaw members 26 and 40 for use on an electrical power line or conductor of smaller diameter than the base member B and cover C. Of course, an alternate or rear base member and second cover member of similar size and configuration to the alternate cover member C-1 would be used as well for the particular power line size in question. The base member B and cover member C are adapted to form a sleeve of about a nominal 1.17" in inner diameter, while base member B-1 and cover member C-1 form a sleeve of a nominal 0.398" inner diameter. It should be understood that a number of other sets of matching base members and covers, each set matched to different sizes or diameters of electrical power lines can be used with the jaw members 26 and 40 of the preform remover R.

In the base member B-1, like structure to that of the base member B, bears like reference numerals. The primary difference between base members B and B-1 is the inner diameter and curvature of a cylindrical inner surface 132 (FIG. 7) in base member B-1 defining a smaller half-bore 134 for a smaller diameter sleeve into which a smaller diameter power line is fitted. The preform contact 78 of the base member B-1 is also provided with a contact surface 136 of smaller arcuate span and size.

Similarly, like structure in the cover C-1 to that of the cover C bears like reference numerals. A semi-cylindrical passage 138 of corresponding size to the half-bore 134 is formed in the cover C-1 adjacent a cylindrical wall or surface 140. Because of the smaller passage 138, the rear sleeve portion 46 has a thicker inner wall 142 in the cover C-1 than in the cover C.

In the operation of the present invention, a preform remover R is first fitted with an appropriately sized base member and cover for the power line in question. The preform remover R is then moved by hot stick so that the channel 14 in base member B is fitted over the power line E. The weight of the preform remover R is usually adequate to keep it resting thus along channel 14 over the power line E.

The eyelet 126 at the end of the threaded rod 122 is then engaged by a single hot stick and rotated, closing the jaw member 40 and cover member C onto the power line E to form the sleeve S. It is to be noted that even with a preform P for a power line E of a particular size, the relative positions of jaw members 40 and 26 can be adjusted to insure adequate clearance about the power line E. Thus, provision is made for relative ease of sliding movement and rotation of the preform remover along the power line E.

Once the preform remover R is properly mounted on the power line, it can then be moved using a hot stick along the power line until the preform contact 78 contacts the end portion N of the preform P. At this time, the preform remover R can be rotated about the power line E engaging either of the eyelets 74 and 126 with a hot stick. As the preform remover R is rotated about the power line E by the hot stick, it is also advanced in a direction past or behind the end portion N of the preform.

As the preform remover R is rotated and advanced along the power line E behind the end portion N, the preform is unwrapped and stripped from the power line. In the event any binding or resistance is encountered to either rotational or sliding movement of remover R along power line E, the relative position of jaw members 26 and 42 may be appropriately adjusted by hot stick. Dismounting the remover R is also easily done. The movable jaw 42 is retracted from jaw member 26 a sufficient distance to provide clearance between the jaw members past the power line E.

Having described the invention above, various modifications of the techniques, procedures, material and equipment will be apparent to those in the art. It is intended that all such variations within the scope and spirit of the appended claims be embraced thereby.

I claim:

1. A preform remover for removing a wrapped wire preform from an electrical power line, comprising:
    a support body;
    a first jaw member mounted on said support body;
    a base member mounted with said first jaw member and having a channel formed therein for receiving a portion of the electrical power line for passage therethrough;
    a second jaw member movably mounted on said support body;
    a cover mounted with said second jaw member and adapted to be fitted on said base member forming a sleeve therewith having a bore therein for passage of the electrical power line;
    a handle mounted on said support body and adapted for movement therewith, said handle adapted to be engaged by an insulative rod to rotate said sleeve with respect to the electrical power line;
    a gear mechanism connecting said handle and second jaw member;
    said handle being further adapted to cause said gear mechanism to move said second jaw member with respect to said first jaw member to open and close said sleeve on the electrical power line;
    a preform contact formed on said sleeve for engaging and unwrapping the preform as the sleeve is rotated on the electrical power line.

2. The apparatus of claim 1, wherein said means for moving comprises:
    means for adjusting the relative spacing of said first and second jaw members for proper fit of said sleeve on the electrical power line.

3. The apparatus of claim 1, wherein said bore of said sleeve is coaxial with a longitudinal axis of the electrical power line, wherein said means for moving comprises:
    means for moving said first and second jaw members transversely with respect to the longitudinal axis of the electrical power line.

4. The apparatus of claim 1, wherein:
    said handle is mounted with said second jaw member.

5. The apparatus of claim 4, further including:
    a second handle is mounted with the other of said jaw members.

6. The apparatus of claim 1, wherein:
said handle is rotatably mounted with said second jaw member.

7. The apparatus of claim 6, wherein:
said handle is connected to said gear mechanism for operating same.

8. The apparatus of claim 1, further including:
first connector means releasably mounting said base member with said first jaw member;
second connector means releasably mounting said cover with said second jaw member;
said first and second connector means permitting attachment of base members and covers of different size to accommodate different sizes of electrical power lines in the preform remover.

9. The apparatus of claim 1, further including:
a second base member spaced rearwardly from said base member, said second base member having a channel formed therein for receiving a portion of the electrical power line for passage therethrough;
a second cover spaced rearwardly from said cover, said second cover adapted to be fitted on said second base member forming a second sleeve therewith having a bore for passage of the electrical power line therethrough.

10. The apparatus of claim 1, wherein said preform contact comprises:
a tapered leading contact surface formed on said sleeve for contacting and wedging the preform away from the electrical power line; and
an unwrapping arm extending outwardly from said sleeve for uncoiling the wedged preform away from the electrical power line as the sleeve is rotated.

11. A preform remover for removing a wrapped wire preform from an electrical power line, comprising:
a support body:
a base member having a channel formed therein for receiving a portion of the electrical power in for passage therethrough;
a cover adapted to be fitted on said base member forming a sleeve therewith having a bore for passage of the electrical power line therethrough;
a first jaw member mounted on said support body and having said base member mounted therewith;
a second jaw member movably mounted on said support body and having said cover mounted therewith;
means for moving said jaw members with respect to each other to open and close said sleeve on the electrical power line;
a handle adapted to be engaged by an insulative rod to rotate said sleeve with respect to the electrical power line; and
a preform contact formed on said sleeve for engaging and unwrapping the preform as the sleeve is rotated on the electrical power line, said preform contact comprising:
a tapered leading contact surface formed on said sleeve for contacting and wedging the preform away from the electrical power line; and
an unwrapping arm extending outwardly from said sleeve for uncoiling the wedged preform away from the electrical power line as the sleeve is rotated.

12. The apparatus of claim 11, wherein said means for moving comprises:
means for adjusting the relative spacing of said base member and cover for proper fit of said sleeve on the electrical power line.

13. The apparatus of claim 11, wherein said bore of said sleeve is coaxial with a longitudinal axis of the electrical power line, wherein said means for moving comprises:
means for moving said jaw members transversely with respect to the longitudinal axis of the electrical power line.

14. The apparatus of claim 11, wherein:
said handle is connected with one of said jaw members.

15. The apparatus of claim 14, further including:
a second handle connected with the other of said jaw members.

16. The apparatus of claim 11, wherein:
said handle is rotatably mounted with one of said jaw members.

17. The apparatus of claim 16, wherein:
said handle is connected to said means for moving for operating same.

18. The apparatus of claim 11, further including:
first connector means releasably mounting said base member with said first jaw member;
second connector means releasably mounting said cover with said second jaw member;
said first and second connector means permitting attachment of base members and covers of different sizes to accommodate different sizes of electrical power lines in the preform remover.

19. The apparatus of claim 11, further including:
a second base member spaced rearwardly from said base member, said second base member having a channel formed therein for receiving a portion of the electrical power line for passage therethrough;
a second cover spaced rearwardly from said cover, said second cover adapted to be fitted on said second base member forming a second sleeve therewith having a bore for passage of the electrical power line therethrough.

20. The apparatus of claim 11, wherein said preform contact comprises:
a tapered leading contact surface formed on said sleeve for contacting and wedging the preform away from the electrical power line; and
an unwrapping arm extending outwardly from said sleeve for uncoiling the wedged preform away from the electrical power line as the sleeve is rotated.

21. The apparatus of claim 11, wherein said unwrapping arm is located rearwardly of the contact surface on said preform contact.

22. A method of removing a wrapped wire preform from an electrical power line with one insulative rod and a preform remover tool having a preform contact, comprising the steps of:
fitting the power line in a channel formed in a base member of the preform remover tool;
moving a cover of the preform remover tool with respect to the base member to form a sleeve fitted abut the electrical power line;
prying loose an end of the wrapped wire with the preform contact to separate the wrapped wire from the electrical power line;
rotating the wrapping removal tool with the single insulative rod; and
stripping the separated portion of the wrapped wire from the electrical power line during said step of rotating.

23. The method of claim 22, wherein the channel in the base member is coaxial with the longitudinal axis of the electrical power line and wherein said step of moving comprises the step of:

moving the cover transversely with respect to the longitudinal axis of the electrical power line.

24. The method of claim 22, wherein a gear mechanism of the preform remover causes the cover to move with respect to the base member, and wherein said step of moving comprises the steps of:

engaging the preform remover tool with a single insulative rod; and rotating the insulative rod to drive the gear mechanism of the preform remover tool.

* * * * *